(12) United States Patent
Lin

(10) Patent No.: US 7,075,529 B1
(45) Date of Patent: Jul. 11, 2006

(54) METHOD OF PROCESSING DIVERSE THREE-DIMENSIONAL GRAPHIC OBJECTS

(75) Inventor: Tsung-Wei Lin, Taipei (TW)

(73) Assignee: Ulead Systems, Inc., Taipei (TW)

( * ) Notice: Subject to any disclaimer, the term of this patent is extended or adjusted under 35 U.S.C. 154(b) by 0 days.

(21) Appl. No.: 09/290,608

(22) Filed: Apr. 13, 1999

(30) Foreign Application Priority Data

Sep. 25, 1998 (TW) .......................... 87116023 A

(51) Int. Cl.
 *G06T 17/00* (2006.01)

(52) U.S. Cl. ........................................ 345/419
(58) Field of Classification Search ........... 345/418, 345/419, 429, 432, 441, 470
See application file for complete search history.

(56) References Cited

U.S. PATENT DOCUMENTS

| 5,537,126 A | 7/1996 | Kayser et al. |
| 5,736,967 A | 4/1998 | Kayser et al. |
| 5,753,900 A | 5/1998 | Goodwin, III et al. |
| 5,828,380 A | 10/1998 | Lin |

*Primary Examiner*—Cliff N. Vo
(74) *Attorney, Agent, or Firm*—Stewart, Stewart, Kolasch & Birch, LLP

(57) ABSTRACT

A method of rendering a 2-D graphic object having a plurality of pixels to a 3-D graphic object is disclosed. At first, a directional relation corresponding to the pixels is determined to define relations between the pixels and edges of the 2-D graphic object. Then, z-axis parameters corresponding to the pixels are generated in response to the directional relation with an effect function, wherein the effect function renders the z-axis parameters responsive to a relation limit varied with directions of the directinoal relation or a mapping table defining offset values of the z-axis parameters, or both. Finally, the 3-D graphic object is rendered in response to the 2-D graphic object and the z-axis parameters.

6 Claims, 5 Drawing Sheets

(1 of 5 Drawing Sheet(s) Filed in Color)

US 7,075,529 B1

METHOD OF PROCESSING DIVERSE THREE-DIMENSIONAL GRAPHIC OBJECTS

BACKGROUND OF THE INVENTION

1. Field of the Invention

The patent or application file contains at least one drawing executed in color. Copies of this patent or patentg application publication with color drawing (s) will be provided by the Office upon request and payment of the necessary fee.

The present invention generally relates to computer graphics. More particularly, the present invention relates to a method of processing diverse graphic objects that are rendered visually three-dimensional (3D) by relation map function.

2. Description of the Related Art

The growing popularity of computers has enabled conventional film clips, graphics and pictures to be digitized for computer processing, allowing special visual effects never before possible. Computer imaging or graphing is also gaining a foothold in almost every profession because of the widespread use of computers. However, the restricted features of the video display and the computer have made typical computer applications more suitable for processing 2-D graphic objects and for presenting 2-D effects rather than for processing 3-D graphic objects and presenting 3-D effects.

The conventional method for achieving 3-D effect uses the polygonal approach. In said polygonal approach, a 2-D planar graphics is first determined and segmented into a plurality of polygons with computer operations. Then an interpolation operation is performed to change the associated color value of the pixels of each polygon to render 3-D visual effects. Generally speaking, the 2-D original graphic is usually composed of smooth curves of polynomials and the smooth and gradual visual effect is usually desired. Whereas, the effect of conventional method using plural polygons to change the color values of the pixels is not so satisfactory. For example, if not enough polygons applied, the zigzag distortion will happen on the lines corresponding to the curves of the 2-D original graphic. Thus, the visual effect is adversely affected.

In another way, if the applied polygons are increased to avoid the above-mentioned problem, the processing time will be considerably increased. Additionally, if different kinds of visual effects are desired on a 2-D original graphic, every corresponding segmenting way may be accordingly different and the processing time can be also increased.

Another processing method of rendering 3-D graphic effects with a 2-D graphic object is disclosed in the U.S. Pat. No. 5,828,380 assigned to Ulead Systems, Inc. In said processing method, a relation map function is first given for each pixel of the graphic to obtain the directional relation of the corresponding 2-D graphic object. The required 3-D imaging effects, such as generating the measurement of length corresponding to the third axis (i e., z-axis), can be generated from the acquired directional-relation through an effect function to actualize 3-D visual effects.

FIG. 1 is a diagram illustrating the relation map function of the prior art. For example, a 2-D graphic object is a ring-shape area confined by an outer curve 40 and an inner curve 41. In the drawing, the graphic object is composed of numerous pixels, such as A1, A2, and A3. In said processing method, a relation map function corresponding to pixels of the 2-D original graphics is first obtained, which represents a distance or a vector from every pixel to the corresponding edge of the curves 40 or 41 located closest thereto. In FIG. 1, the relation map function represents the directional relation of the vectors from every pixel to the edges located closest thereto, such as V1, V2, and V3.

Then, an effect function is used to render the 2-D graphic object visually three-dimensional. As to the effect function, a relation limit $d_{max}$ and a predetermined contour curve should be defined. Only those pixels within the range of the distance $d_{max}$ from the edge of the 2-D graphic object are subjected to 3-D processing such as effect on relation map (ERM) functions, whereas the z-axis coordinate of each pixel within that range can be determined by the predetermined contour curve, accordingly.

FIGS. 2a–2c illustrate three possible contour curves in accordance with the effect function. FIG. 2a is a type of rounded bevel, with C1 denoting a contour curve, and the coordinate of the pixel (x,y) starting from the edge within a relation limit $d_{max}$ determines the corresponding coordinate on the axis z in accordance with said contour curve C1. Further, FIG. 2b is a type of straight bevel, with C2 denoting a contour curve; and FIG. 2c a combined type of two rounded bevels, with C3 denoting a contour curve.

Taking the rounded bevel type of FIG. 2a as an example, assume the distance from the coordinate of the pixel (x,y) to the edge of the corresponding edge is $L(=\sqrt{x^2+y^2})$; then the z-axis parameters of said pixel (x,y) can be determined as follows:

$$z = L \times \tan[\cos^{-1}((d_{max}-L)/d_{max})] \qquad (1)$$

The computations of z-axis parameters under other circumstances can also be made in a similar manner. In other words, the z-axis coordinate corresponding to each pixel within the relation limit $d_{max}$ in the above contour curves can be calculated with mathematical equations.

Though the conventional effect function may rapidly render visually 3-D effects with quite simple operations processing, its application still demonstrates some inadequacies. First, it is restricted by the inflexibility of the relation limit $d_{max}$ in that the portion to be 3-D mapped can only be displayed in a symmetrical pattern. Referring to FIG. 3, wherein the outer curve defines the area of a 2-D graphic object, the portion to be 3-D mapped is within the range 0 to $d_{max}$. FIGS. 4a–4c are diagrams illustrating a stereograph of a 3-D graphic object of FIG. 3 processed with rounded bevel, straight bevel and two-rounded bevels, respectively. As observed from FIGS. 4a–4c, the rendered stereographs are definitely in symmetrical curves. However, even some 3-D model objects (such as pyramids or cones) with a particular symmetrical pattern will show unsymmetrical visual effects when observed from various perspectives. The conventional method can not realize such asymmetrical visual effect.

Second, all the contour curves, such as rounded bevel, straight bevel, two-rounded bevels as shown in FIGS. 2a–2c must be expressed by mathematics formula, and therefore fail to demonstrate a variety of sterographs because of the limited variations of the rigid contour curves and their identical orientations. In summary, the effect function as adopted in the prior art encounters difficulty in rendering diversified graphics.

SUMMARY OF THE INVENTION

Accordingly, it is an object of the present invention to provide a processing method capable of performing variations and creating diversified 3-D graphic objects through an effect function used in the process of rendering 2-D graphic objects to 3-D graphic objects.

According to the above object, the present invention provides a method of rendering a 2-D graphic object having a plurality of pixels to a 3-D graphic object. At first, a directional relation corresponding to the pixels is determined to define relations between the pixels and edges of the 2-D graphic object. Then, z-axis parameters corresponding to the pixels are generated in response to the directional relation with an effect function, wherein the effect function renders the z-axis parameters responsive to a relation limit varied with directions of the directinoal relation or a mapping table defining offset values of the z-axis parameters, or both. Finally, the 3-D graphic object is rendered in response to the 2-D graphic object and the z-axis parameters. Finally, the 3-D graphic object is rendered in response to the 2-D graphic object and the z-axis parameters.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The aforementioned objects, features and advantages of this invention will become apparent by referring to the following detailed description of preferred embodiments with reference to the accompanying drawings, which are given by way of illustration only, and thus are not limitative of the present invention, and wherein;

The patent or application file contains at least one drawing executed in color. Copies of this patent or patent application publication with color drawing (s) will be provided by the Office upon request and payment of the necessary fee.

FIGS. 2a–2c are diagrams illustrating three prospective contours, wherein FIG. 2a is a type of a rounded bevel, FIG. 2b is a type of straight bevel, and FIG. 2c is a combined type of two rounded bevels;

DETAILED DESCRIPTION OF PREFERRED EMBODIMENTS

Figure 1:
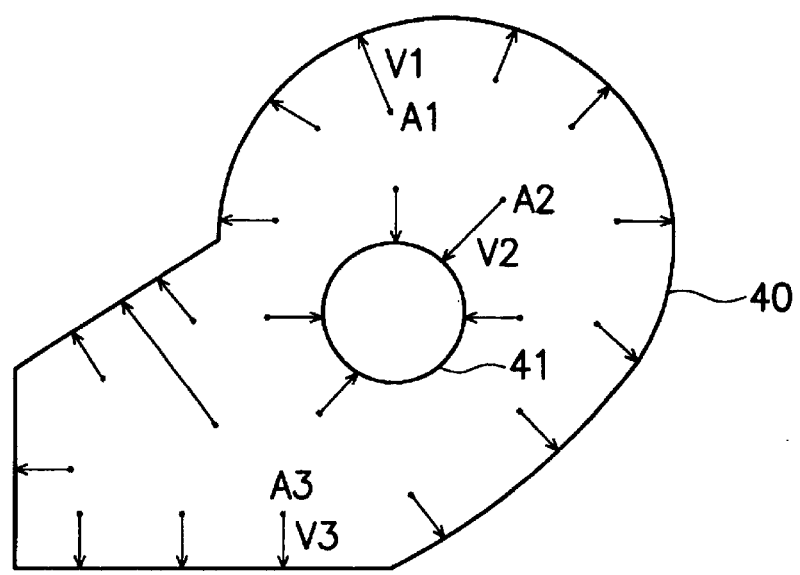
FIG. 1 is a diagram illustrating a relation map function of a graphic in prior art.
Figure 2A:
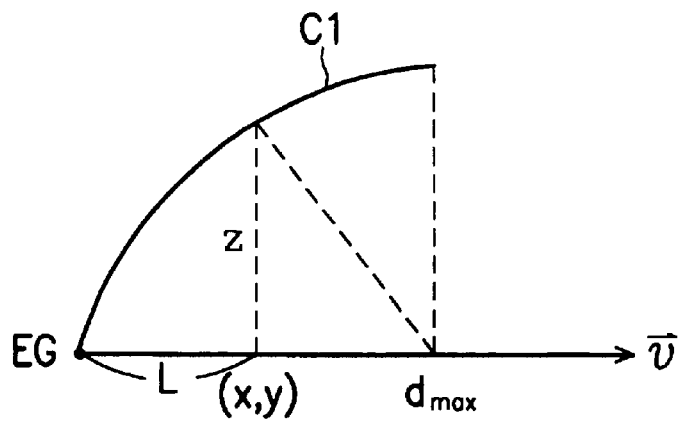
Figure 2B:
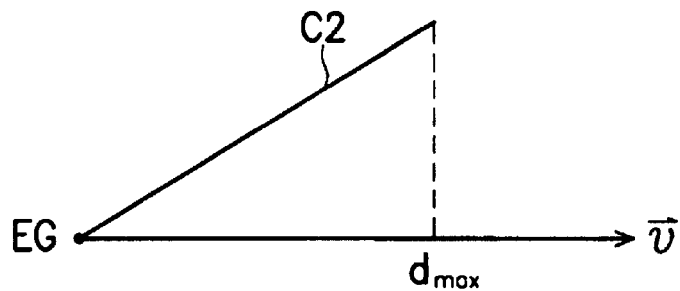
Figure 2C:
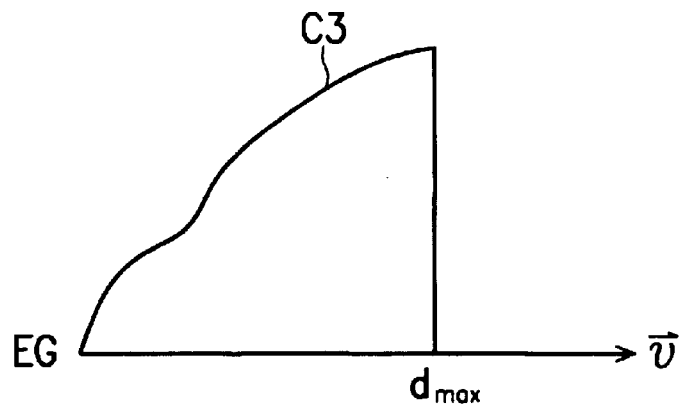

The processing method of rendering diversified 3-D graphic objects as disclosed in this invention is realized by changing the effect function E (.). It is known from the effect function of the prior art (such as FIGS. 2a, 2b and 2c) that the rendered effect is mainly controlled by two variables, namely, the relation limit $d_{max}$ and the contour curves (C1, C2, and C3). The relation limit $d_{max}$ specifies the range of variations in the 3-D modeling area, whereas the contour curves specifies the type of variation within said range, for corresponding respectively to the border and the depth of a 3-D graphic object in terms of actual visual effect. Actual contents will be described in a respective embodiment with reference to the drawings.

First Embodiment (Variable Relation limit)

Figure 3:
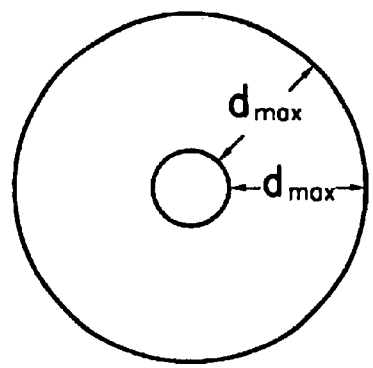
FIG. 3 is a diagram illustrating the range of the relation limit of a round graphic object.

The relation limit $d_{max}$ of effect function E(.) in the prior art is a fixed value, that is, the rendered 3-D graphic object shows a certain symmetry as shown in FIG. 3. In this embodiment, the relation limit is set as a function for the orientation of the pixel vector mapping. Consequently, the borders vary according to various directions or orientations.

Figure 5:
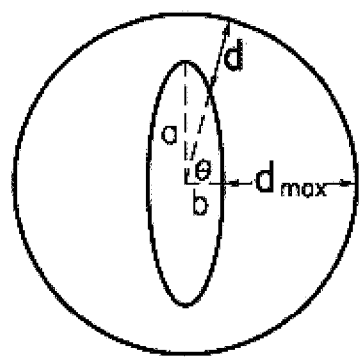
FIG. 5 is a diagram illustrating an example within the range of various relation limits in accordance with the first embodiment of the present invention.

FIG. 5 is a diagram illustrating an example within the range of various relation limits in accordance with the first embodiment of the present invention. FIG. 5 illustrates an example with an elliptical area relation limit. As shown in the figure, the maximal relation limit is $d_{max}$ and the relation limit d of other orientations is a function of angle θ formed with its direction on x-axis. So the effect function can be represented as E (υ, d (θ, $d_{max}$), C), wherein υ represents directional relation of pixels, C its corresponding contour curve, and the relation limit d is a function of the maximal length $d_{max}$ and its angle θ.

In the case of the ellipse of FIG. 5, the length of $d/d_{max}$ at the direction d can further be given as:

$$(d/d_{max})\Big|_{d\text{-direction}} = \frac{d_{max} + b - \sqrt{a^2\cos^2\theta + b^2\sin^2\theta}}{d_{max}} \quad (2)$$

Therein, a is a long axis, b a short axis, θ an angle formed between the direction d and the direction of the short axis; $(d_{max}+a)>b$; and a,b>0. Therefore, various borders can be rendered for various directions with the definition of the relation limit.

Figure 4A:
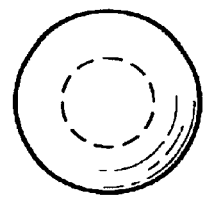
FIGS. 4a–4c are diagrams illustrating a stereograph (3-D modeling) of the 3-D graphic object of FIG. 3 processed with rounded bevel, straight bevel and two-rounded bevels, respectively.
Figure 4B:
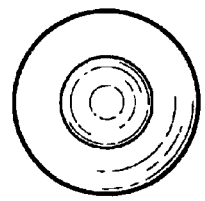
Figure 4C:
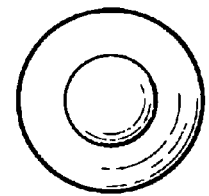
Figure 6:
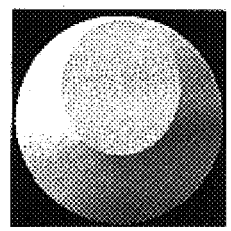
FIG. 6 is a diagram illustrating a stereograph of a 3-D graphic object rendered with various relation limits provided by a mapping table in accordance with the first embodiment of the present invention.

The adaptability of this embodiment also applies to a 3-D symmetrical object observed from various angles. Referring to FIG. 6, a diagram illustrates a stereograph (3-D modeling) of a 3-D graphic object rendered with a relation limit of various borders. As shown in the drawing, the 3-D object is originally a conical object with its top portion cut off, similar to that as shown in FIG. 4b, where the observer perceives from a downwardly skewed angle. Therefore, the cut-off top portion is in an upwardly skewed position (compare and contrast with FIG. 4b). FIG. 6 illustrates a 3-D graphic rendered with the area of the relation limit of the borders and a 3-D modeling process.

Second Embodiment (Variable Contour Curve)

The outlook of a 3-D graphic object is changed through the contour curve C in this embodiment. In the prior art, the contour curve is used to define the z-axis parameter for the distance 0(edge grid EG) to the maximal relation limit $d_{max}$ in all orientations. In this embodiment, however, a mapping table α is added to the contour curve, each item of which corresponds to a pixel of the original 2-D graphic object adjusts its z-axis parameter.

Hence, the effect function during the rendering of a diversified graphic through the mapping table may be represented as $E(\upsilon, d_{max}, C, \alpha)$, allowing the display of diversified graphics of the 3-D graphic object in practical applications. Meanwhile, the original contour can be omitted when the z-axis parameter is adjusted through the mapping table.

Figure 7:
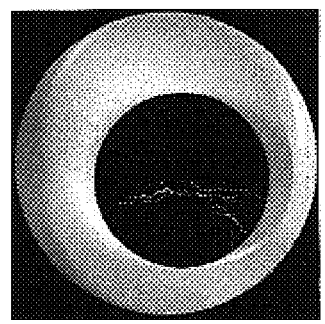
FIG. 7 is a diagram illustrating a stereograph of a 3-D graphic object rendered with various borders and depths.

The border is adjusted in the first embodiment and the depth is adjusted in the second embodiment; however, they can both be applied simultaneously. At that time, the effect function can be represented as $E(\upsilon, d(\theta, d_{max}), C, \alpha)$. FIG. 7 is a diagram illustrating a stereograph of a 3-D graphic object rendered with various borders and depths. The control of the relation limit and the addition of a mapping table enable variations of the 3-D graphic object; therefore, the object of this invention is realized.

Although the present invention has been described in its preferred embodiments, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of rendering a 2-D graphic object, having a plurality of pixels, to a 3-D graphic object, comprising the following steps of:

determining a directional relation corresponding to said pixels, wherein said directional relation defines relations between said pixels and edges of said 2-D graphic object;

generating z-axis parameters corresponding to said pixels in response to said directional relation with an effect function, wherein said effect function renders said z-axis parameters responsive to a relation limit varied with directions of said directional relation; and rendering said 3-D graphic object in response to said 2-D graphic object and said z-axis parameters.

2. The method as claimed in claim 1, wherein each of said pixels comprises red data, blue data, green data and alpha channel data.

3. The method as claimed in claim 1, wherein each of said directional relation defines relative edge positions of said 2-D graphic object closest to said pixels.

4. A method of rendering a 2-D graphic object, having a plurality of pixels, to a 3-D graphic object, comprising the following steps of:

determining a directional relation corresponding to said pixels, wherein said directional relation defines relations between said pixels and edges of said 2-D graphic object;

generating z-axis parameters corresponding to said pixels in response to said directional relation with an effect function, said effect function renders said z-axis parameters responsive to a relation limit varied with directions of said directional relation, a contour curve, and a mapping table defining offset values of said z-axis parameters; and rendering said 3-D graphic objection in response to said 2-D graphic objection and said z-axis parameters.

5. The method as claimed in claim 4, wherein each of said pixels comprises red data, blue data, green data and alpha channel data.

6. The method as claimed in claim 4, wherein each of said directional relation defines relative edge positions of said 2-D graphic object closest to said pixels.

* * * * *